US005700851A

United States Patent [19]

Banning et al.

[11] Patent Number: 5,700,851
[45] Date of Patent: Dec. 23, 1997

[54] INK-JET INK COMPOSITION CONTAINING A COLORED POLYURETHANE DISPERSION

[75] Inventors: Jeffery H. Banning, Hillsboro; Loc V. Bui, Beaverton, both of Oreg.

[73] Assignee: Tektronix, Inc., Wilsonville, Oreg.

[21] Appl. No.: 543,966

[22] Filed: Oct. 17, 1995

[51] Int. Cl.$^6$ .................. C08J 3/00; C08K 3/20; C08L 75/00; G01D 11/00
[52] U.S. Cl. .......... 523/161; 106/19 R; 106/20 R; 106/22 R; 106/22 H; 106/20 D; 106/19 F; 523/161; 524/591; 524/839; 524/840; 347/99; 347/100
[58] Field of Search ............... 523/160, 161; 524/591, 839, 840; 106/19 R, 20 R, 22 R, 22 H, 20 D, 19 F

[56] References Cited

U.S. PATENT DOCUMENTS

| | | | |
|---|---|---|---|
| 3,993,619 | 11/1976 | Kruckenberg et al. | 260/205 |
| 4,147,679 | 4/1979 | Scriven et al. | 524/839 |
| 4,284,729 | 8/1981 | Cross et al. | 521/158 |
| 4,471,079 | 9/1984 | Enami | 523/161 |
| 4,476,210 | 10/1984 | Croucher et al. | 430/144 |
| 4,530,961 | 7/1985 | Nguyen et al. | 524/832 |
| 4,596,846 | 6/1986 | Bohne et al. | 524/173 |
| 4,705,567 | 11/1987 | Hair et al. | 106/20 |
| 4,740,549 | 4/1988 | Okuzono et al. | 524/379 |
| 4,778,742 | 10/1988 | Ong et al. | 430/106 |
| 4,786,198 | 11/1988 | Zgambo | 401/142 |
| 4,795,794 | 1/1989 | Winnik et al. | 526/259 |
| 4,874,832 | 10/1989 | Jabs et al. | 528/60 |
| 4,880,432 | 11/1989 | Egan et al. | 8/647 |
| 4,945,121 | 7/1990 | Micale et al. | 523/339 |
| 5,100,471 | 3/1992 | Winnik et al. | 106/23 |
| 5,104,913 | 4/1992 | Sharma et al. | 523/339 |
| 5,145,883 | 9/1992 | Saito et al. | 521/172 |
| 5,172,133 | 12/1992 | Suga et al. | 346/1.1 |
| 5,194,463 | 3/1993 | Krutak et al. | 524/35 |
| 5,203,913 | 4/1993 | Yamamoto et al. | 106/22 B |
| 5,217,255 | 6/1993 | Lin et al. | 281/15.1 |
| 5,230,733 | 7/1993 | Pawlowski | 106/22 |
| 5,275,647 | 1/1994 | Winnik | 106/22 E |
| 5,310,887 | 5/1994 | Moore et al. | 534/729 |
| 5,441,561 | 8/1995 | Chujo et al. | 106/20 |
| 5,443,628 | 8/1995 | Loria et al. | 106/20 |

FOREIGN PATENT DOCUMENTS

WO97/12003  4/1997  WIPO.
WO97/13816  4/1997  WIPO.

OTHER PUBLICATIONS

Miles Product Brochure *"Waterborne Polyurethanes"* as excerpted from Advances in Urethane Science and Technology by K.C. Frisch & D. Klempner Editors, vol. 10, pp. 121–162 (1987).

*Primary Examiner*—Patrick Niland
*Attorney, Agent, or Firm*—Ralph D'Alessandro; William A. Simons

[57] ABSTRACT

A non-erasable ink-jet composition that is the admixture of (1) an aqueous colored polyurethane dispersion that is the reaction product of (a) a colored urethane prepolymer that is the catalyzed reaction product of at least one polyol; at least one polyisocyanate; at least one internal surfactant; and at least one reactive colorant; wherein the ratio of internal surfactant to polyol and the ratio of NCO groups to total OH groups are predetermined stoichiometric equivalent molar ratios; (b) at least one neutralizing agent; (c) a first aqueous dispersing medium; and (d) at least one chain extender; (2) a second aqueous medium; and (3) at least one humectant; wherein the ink composition has a jettable viscosity from about 1 to about 20 centipoise at about 10° C. to about 45° C.

37 Claims, No Drawings

INK-JET INK COMPOSITION CONTAINING A COLORED POLYURETHANE DISPERSION

BACKGROUND OF THE INVENTION

1. Field of the Invention

The present invention relates to a non-erasable, permanent aqueous dispersible polymeric ink and its use in ink jet printing processes.

2. Brief Description of the Relevant Technologies

The use of aqueous inks in ink jet type printers is well known. Examples of teachings of such aqueous ink dispersions include the following:

U.S. Pat. No. 4,596,846 (Bohne et al.) teaches an erasable printing ink for ink jet printers comprising a latex-based aqueous polymer dispersion including a water-soluble or organic-solvent soluble dyestuff. The binder in the dispersion is a noncarboxylated styrene butadiene, 2-chlorobutadiene and vinyl pyridine-styrene-butadiene polymers. Also, the colorant material in the ink is not covalently bonded to the resin.

U.S. Pat. No. 4,705,567 (Hair et al.) teaches an ink jet ink composition comprised of water and a dye covalently attached to either a poly(ethylene glycol) or a poly(ethylene imine) which is complexed with certain heteropolyanions.

U.S. Pat. No. 5,172,133 (Suga et al.) teaches an ink jet ink composition containing a pigment, a water-soluble resin and a liquid medium wherein the weight ratio of the resin to the pigment is defined by a certain equation.

U.S. Pat. No. 5,230,733 (Pawlowski) teaches an ink jet ink composition that contains water and a reactive dye comprising a polymeric chain with carboxyl groups and either hydroxyl groups or amine groups having the capability to form at least one 5 to 8 member lactone or lactam ring by condensing the carboxyl groups but remaining in the ring open form when dissolved in aqueous inks at slightly basic pH and having at least one chromophore attached to the chain.

U.S. Pat. No. 5,310,887 (Moore et al.) discloses the use of polymeric colorants that are used in aqueous ink compositions at pH's above 8 and are waterfast.

U.S. Pat. No. 5,441,561 (Chujo et al.) teaches an ink-jet recording ink comprising water, a water-soluble organic solvent and a color material and having a certain range of total volume of particulate matter in the ink.

U.S. Pat. No. 5,443,628 (Loria et al.) teaches an ink composition suitable for ink jet printing comprising water, a binder resin and a dispersion of synthetic pigment particles that have a certain particle size.

Separately, the preparation of aqueous polyurethane dispersions is well known. Specifically, it is known to react an isocyanate, polyol and a surfactant together to form a polyurethane prepolymer; followed by neutralizing that prepolymer with an amine; then forming an aqueous polyurethane dispersion by adding water and a chain extender. See Miles Product Brochure "Waterborne Polyurethanes" as excerpted from "Advances in Urethane Science and Technology" K. C. Frisch and D. Klempner, Editors, Vol. 10, pp 121–162 (1987). Also, it is known to use polymeric liquid reactive coloring agents that are suitable for incorporation into a thermosetting resin, such as polyurethane, through the use of covalent bonds as taught in U.S. Pat. No. 4,284,729 (Cross et al.) to obtain coloration of foam materials.

And separately, the use of polyurethane polymers in ball point pen inks and the like (but not in ink jet ink compositions) is well known. For example, U.S. Pat. No. 5,194,463 (Krutak et al.) teaches light-absorbing polyurethane compositions may be used in ink compositions. See column 19, lines 17–37 of this reference.

One disadvantage with using dispersions, such as in ink-jet inks, is the tendency for the dispersed particles to settle out of the liquid carrier medium or solution. This appears to be a particle size or particle stabilization phenomena. Settling can be characterized as hard settling, where the particles can not be redispersed, or soft settling, where the particles are redispersible in the liquid carrier medium with a minimum of agitation. For example, in a ball point pen settled and agglomerated particles can be redispersed or simply forced out of the pen by pressing on the pen tip so that the moderate pressure applied by the writer's hand will translate to high pressure on the tip of the ball point, deforming the agglomerated/settled particles and permitting them to pass through the opening in the pen point with the carrier liquid. Inks used in ink jet formulations, however, must have particles sizes sufficiently small as not to coalesce and settle out, thereby clogging the print head orifice. Once the print head is clogged, there is no way for sufficient force to be applied through liquid pressure in the print head to unclog the print head orifice.

Attempts to overcome this problem have lead to the use of polymeric dyes in acid form where the polymer is covalently bonded to the chromophore, but such dyes must then be solubilized through the use of a basic salt. This results in a system that is buffered at a basic pH, otherwise the polymeric dye does not remain soluble and precipitates out at neutral or acidic pH's.

The present invention seeks to retain the advantages of the prior art aqueous ink-jet ink compositions, yet overcome their disadvantages. These disadvantages include feathering and low water fastness for water soluble dye based systems and inherent instability settling problems for pigment based systems.

BRIEF SUMMARY OF THE INVENTION

Accordingly, one aspect of the present invention is directed to an ink-jet ink composition capable of forming thin, durable plastic films on a substrate comprising the admixture of:

(1) an aqueous colored polyurethane dispersion that is the reaction product of:
  (a) a colored urethane prepolymer that is the catalyzed reaction product of:
    (i) at least one polyol;
    (ii) at least one polyisocyanate;
    (iii) at least one internal surfactant; and
    (iv) at least one reactive colorant;
  (b) at least one neutralizing agent;
  (c) an aqueous dispersing medium; and
  (d) at least one chain extender,
(2) optionally at least one plasticizer;
(3) an aqueous medium; and
(4) at least one humectant, wherein the ink composition is permanent and has a jettable viscosity from about 1 to about 20 centipoise at about 10° C. to about 45° C. and wherein the thin, durable plastic film formed from the ink has a storage modulus (E') from about $1 \times 10^8$ to about $4 \times 10^{10}$ dynes per square centimeter.

A second aspect of the present invention is directed to the process of using the above-noted permanent ink-jet ink composition in an ink-jet printer.

It is a feature of the present invention that the polyurethane dispersion is composed of particles ranging in size from about 0.01 micron to about 5.0 microns, more preferably from about 0.03 micron to about 1.00 micron.

It is another feature of the present invention that the particles in the polyurethane dispersion coalesce together as the aqueous carrying medium evaporates.

It is an advantage that the thin, plastic film formed from the ink of the present invention has high tensile strength and strong adhesion to the final receiving substrate.

It is another advantage of the present invention that the colorant is built into the polyurethane back bone of the molecule by covalent bonding.

DETAILED DESCRIPTION OF PREFERRED EMBODIMENTS

As stated above, the non-erasable, permanent ink-jet ink composition of the present invention has three (3) critical ingredients, namely, (1) an aqueous colored polyurethane dispersion; (2) an aqueous medium and (3) at least one humectant. Optionally at least one plasticizer can be included in the composition.

The aqueous colored polyurethane dispersion ingredient of this ink composition is the reaction product of four reactive precursors, namely, (a) a colored urethane prepolymer; (b) at least one neutralizing agent; (c) an aqueous dispersing medium; and (d) at least one chain extender.

The colored urethane prepolymer is the catalyzed reaction product of (i) at least one polyol; (ii) at least one polyisocyanate; (iii) at least one internal surfactant; and (iv) at least one reactive colorant.

Suitable polyols for use in the ink compositions of the present invention include any polyols that could be used in making aqueous polyurethane dispersions for the present intended purpose. These include polyether, polyester, polycarbonate, and silicone based polyols.

Suitable polyisocyanates include aliphatic, cycloaliphatic, aromatic and heterocyclic polyisocyanates that could be used in making aqueous polyurethane dispersions for the present intended purpose. These include for example, ethylene diisocyanate, tetramethylene 1,4-diisocyanate, hexamethylene 1,6-diisocyanate, dodecane 1,12-diisocyanate, cyclobutane 1,3-diisocyanate, cyclohexane 1,3 and 1,4-diisocyanate, and also any mixtures of these isomers, 1-isocyanato-3,3,5-trimethyl-5-isocyanatomethyl-cyclohexane, hexahydrotoluene 2,4- and 2,6-diisocyanate, and any mixtures of these isomers, hexahydrophenylene 1,3-and/or 1,4-diisocyanate, perhydrodiphenylmethane 2,4'- and/or 4,4'-diisocyanate, phenylene 1,3- and 1,4-diisocyanate, toluene 2,4- and 2,6-diisocyanate, and any mixtures of these isomers, diphenylmethane 2,4'- and/or 4,4'- diisocyanate, naphthalene 1,5-diisocyanate, triphenylmethane 4,4',4"-triisocyanate, tetramethylxylene diisocyanate (TMXDI) and polyphenyl-polymethylene polyisocyanates.

Suitable internal surfactants include both anionic and cationic internal surfactants. These include sulfonate diamines and diols, as well as dihydroxy carboxylic acids. The most preferred internal surfactant is $\alpha,\alpha$-dimethylolpropionic acid (DMPA).

Suitable reactive colorants include any colorant materials that are reactive to the isocyanate moiety and provide coloration in the IR, UV or visible spectrum. Preferably these include hydroxyl-containing or amine-containing colorants (i.e. with 2 or more —OH, —NH, —NH$_2$, and —SH groups). Suitable colorants include Color Index (C.I.) Solvent Red 17 and C.I. Disperse Blue 23.

The catalyst for this prepolymer-forming reaction may be any conventional urethane forming catalyst. One preferred catalyst is dibutyltin dilaurate.

The amount of each of the reactants in the prepolymer have preferably the ratio of internal surfactant to polyol of about 0.5:1 to about 2.0:1 and a ratio of NCO groups to total OH groups of about 1.2:1 to about 2.0:1. It is desired to have a high internal surfactant to polyol ratio and a low NCO group to OH group ratio.

Generally, the reaction is carried out at about 70° to about 100° C. for about 1 to about 5 hours until the theoretical isocyanate content, as determined by the di-n-butylamine titration method, was reached to form an isocyanate-terminated prepolymer containing both internal surfactant and colorant moieties therein.

This isocyanate terminated prepolymer, with DMPA as the internal surfactant, is then reacted with a neutralizing agent, such as an appropriate trialkylamine, preferably triethylamine. The amount of neutralizing agent used is dependent upon the amount of internal surfactant and ranges from about 50 to about 102 percent of the quantity of internal surfactant present, more preferably about 90 to about 102 percent of the quantity of surfactant. For example, where about 10.24 grams of DMPA are used, the amount of the triethylamine neutralizing agent can vary from about 3.86 to about 7.81 grams based on stoichiometric equivalent moles. This neutralization step allows the prepolymer to be dispersible by the neutralization of the carboxylic acid sites on the internal surfactants.

The neutralized prepolymer is then formed into an aqueous dispersion by combining it with water under conventional dispersion-forming conditions. The amount of water added is based on the desired percentage of solids in the final polyurethane dispersion and can range from about 50 to about 90 percent water and preferably is between about 60 to about 70 percent water. A chain extender such as a suitable diamine, triamine, diol or a triol, is then added to increase the molecular weight of the dispersed colored polyurethane by using an amount stoichiometrically equivalent to about 60 to about 100 percent of the amount of prepolymer and most preferably about 85 to about 95 percent of the amount of the prepolymer. The molecular weight of the polyol employed and the particular chain extender used can impact the adhesion of the ink to the final receiving substrate. Ethylene diamine is the preferred chain extender.

Any suitable amounts of prepolymer, neutralizing agent, water and chain extender may be added to the prepolymer as long as a stable colored polyurethane dispersion of appropriate color strength is formed. The colorant may comprise from about 1 to about 20 percent by weight of the prepolymer and most preferably is from about 7 to about 19 percent by weight.

The equipment for making the aqueous colored polyurethane dispersion may be any standard dispersion equipment, such as a high speed impeller disc.

The colored polyurethane dispersion is then combined with an aqueous medium, at least one humectant, and optionally at least one plasticizer.

Sufficient water is added to lower the viscosity of the formed ink composition to obtain a "jettable" viscosity and appropriate color strength. A viscosity of about 1 to about 20 centipoise, as measured with a Brookfield viscometer, is desirable. A most preferred viscosity range is from about 1.5 to about 15 centipoise.

One or more humectants may be used to prevent the ink jet tip from drying, and the nozzle/valve from clogging. It can also act as a viscosity control agent. Different molecular weights of polyethylene glycols have different solution viscosities. Ink viscosity can be tailor-made by making use of this property. Humectants useful in the ink compositions of the present invention include glycerol, propylene glycol and polyethylene glycols, such as those sold under the tradenames Carbowax 200, Carbowax 300, Carbowax 400, Carbowax 600, and Carbowax 3350 by Union Carbide. Propylene glycol is preferred.

The humectant should be present in an amount from about 2% to about 20% by weight of the ink composition, with an amount of from about 4% to about 10% by weight being preferred.

Optional plasticizers include aliphatic polyols, phthalate esters (such as 1,6-hexane diol and dioctylphthalate), as well as other urethane compatible plasticizers.

Other components may also be included in the ink compositions of the present invention to impart characteristics desirable for ink jet printing applications.

Resins may also be added to adjust the viscosity of the ink compositions. Useful resins include polyester emulsions, acrylic emulsions, acrylic resins, polyvinyl alcohol, cellulose acetate resin, polyvinyl pyrrolidone, styrenated shellac emulsions and acrylated shellac emulsions.

Other optional components include conductivity agents, defoamers, anti-oxidants and corrosion inhibitors which improve ink manufacturing and printer performance; bacteriocides, which prevent bacterial attack that fouls ink manufacturing equipment and printers; and pH control agents, which insure that the components of the ink composition remain soluble throughout the operable range of water contents as well as throughout the period of storage and use.

The present invention may also comprise other additives, which may be any substance that can enhance the ink with regard to (i) improved solubility of other components, (ii) improved print quality, (iii) improved adhesion of the ink to the media, and (iv) control of wetting characteristics, which may be related to such properties as surface tension and viscosity, among other properties.

The dispersed particles of polyurethane must be of a size such that they are not large enough to clog the print head orifice and have a sufficiently small size that they will be indefinitely stable because of the internal surfactant that minimizes agglomeration and coalescence in the liquid dispersion. Suitable particle sizes can range from about 0.02 microns to about 5.00 microns, but more preferably are from about 0.03 microns to about 1.00 microns. This size range permits the particles and the resultant ink in which they are dispersed to overcome settling and stability/dispersing problems.

Once jetted from an ink jet print head, the ink with the combined polymeric dyes and polyurethane particles displays increased tensile strength and adhesion. The polyurethane particles, which are preferably submicron in size, coalesce together as the aqueous carrying medium evaporates to form the non-erasable, hard plastic film on the receiving substrate that is waterfast and non-reversible. The inks have a high degree of transparency and brightness.

These polyurethane particles remain stabilized or dispersed in a liquid carrying medium having a pH of from about 4 to about 10, more preferably from about 5 to about 9, and most preferably from about 6 to about 8.

The following Examples further illustrate the present invention. All parts and percentages are by weight and all temperatures are degrees Celsius unless explicitly stated otherwise.

EXAMPLE 1

A. Prepolymer Formation

A polyol[1], a hydroxyl-containing reactive colorant[2] and an internal surfactant[3] previously dissolved in N-methylpyrrolidone (NMP) were combined in a reaction vessel and heated to about 80° to about 90° C. Immediately upon reaching that temperature range, dibutyltin dilaurate catalyst (0.10 grams) was added to the vessel. A diisocyanate[4] was then added dropwise to the vessel over a period of 45 minutes, with stirring, and under nitrogen while maintaining temperature. After this addition, the temperature of the reaction mixture was maintained at about 80° to about 90° C. with stirring for 3 additional hours until the theoretical isocyanate content, as determined by the di-n-butylamine titration method, was reached. The amounts of each ingredient are given in Table 1.

[1]TERETHANE 2000 polytetramethylene oxide polyol available from E.I. DuPont deNemours and Company of Wilmington, Del.
[2]MILLIKEN EXP YELLOW DYE (9495-28) available from Milliken and Company of Spartanburg, S.C.
[3]Dimethylolpropionic acid (DMPA) available from Aldrich Chemical of Milwaukee, Wis.
[4]Isopherone Diisocyanate (IPDI) available from Huls America, Inc. of Piscataway, N.J.

B. Neutralization

The prepolymer was then allowed to cool to 65° C. and triethylamine neutralizing agent was then added to the reaction vessel while the stirring continued. The amount of triethylamine is given in Table 1.

C. Preparation of Aqueous Dispersion

A dispersion blade was placed in the reaction vessel and sufficient water was added to the neutralized prepolymer to give about a 35% by weight solids contents. A colored aqueous polyurethane dispersion was prepared by subjecting the mixture to a high speed dispersion (approximately 7500 rpms) for about 5 minutes. The amount of water added is given in Table 1.

D. Chain Extension of Aqueous Dispersion

The dispersion blade in the reaction vessel was replaced with a propeller blade and the aqueous dispersion of Part C was then mildly agitated. Ethylene diamine as a chain extender was added to the agitated aqueous dispersion dropwise over several minutes to chain extend or increase the molecular weight of the colored polyurethane dispersion (PUD). The amount of ethylene diamine added to the dispersion is given in Table 1.

EXAMPLE 2

The procedures of Example 1 were repeated except another hydroxyl-containing reactive colorant[5] was employed. The amounts of the ingredients are given in Table 1.
[5]MILLIKEN EXP ORANGE (9495-28) available from Milliken and Company of Spartanburg, S.C.

EXAMPLE 3

The procedures of Example 1 were repeated except still another hydroxyl-containing reactive colorant[6] was employed. The amounts of the ingredients are given in Table 1.
[6]MILLIKEN EXP RED (9495-28) available from Milliken and Company of Spartanburg, S.C.

EXAMPLE 4

The procedures of Example 1 were repeated except still another hydroxyl-containing reactive colorant[7] was employed. The amounts of each ingredient are given in Table 1.
[7]MILLIKEN EXP VIOLET (9495-28) available from Milliken and Company of Spartanburg, S.C.

EXAMPLE 5

The procedures of Example 1 were repeated except still another hydroxyl-containing reactive colorant[8] was employed. The amounts of each ingredient are given in Table 1.

[8]MILLIKEN EXP BLUE III (9495-28) available from Milliken and Company of Spartanburg, S.C.

EXAMPLE 6

The procedures of Example 1 was repeated except a different diisocyanate[9] and still another hydroxyl-containing reactive colorant[10] were employed. The amounts of each ingredient are given in Table 1.

[9]TMXDI available from Cytec of West Paterson, N.J.
[10]MILLIKEN EXP BLUE II (9495-28) available from Milliken and Company of Spartanburg, S.C.

with wet fingers without any noticeable smearing. In a second test the sample was placed under the running water of a faucet without any noticeable loss in color.

EXAMPLE 9

An aqueous polyurethane dispersion of Example 3 was filtered through a 1 micron glass fiber filter. An ink consisting of about 20.68 g of the filtered polyurethane dispersion Exp-3436-91, about 5.0 g of the humectant 2-pyrrolidone, about 5.0 g of the humectant glycerol, about 5.0 g of the plasticizer 1,6-hexanediol was prepared. The mixture was stirred for 30 minutes at room temperature. To this dispersion, about 1.5 g of the plasticizer dioctylphthalate and about 0.58 g of the surfactant Surfynol 465 ethoxylated tetramethyldecynediol, available from Air Products and Chemicals, Inc. of Allentown, Pa., was added. The mixture

TABLE 1

PREPARATION OF COLORED POLYURETHANE DISPERSION

| Example | Amount of Polyol (grams) | Type of Colorant | Amount of Colorant (grams) | Amount of DMPA (grams) | Amount of NMP (grams) | Type of Diisocyanate | Amount of Diisocyanate (grams) | Amount of Water (grams) | Amount of Triethylamine (grams) | Amount of Ethylene Diamine (grams) |
| --- | --- | --- | --- | --- | --- | --- | --- | --- | --- | --- |
| 1 | 66.94 | Yellow | 24.34 | 10.24 | 17.10 | IPDI | 42.4 | 255 | 7.8 | 3.4 |
| 2 | 66.94 | Orange | 21.93 | 10.24 | 17.10 | IPDI | 42.4 | 255 | 7.8 | 3.4 |
| 3 | 66.94 | Red | 25.60 | 10.24 | 17.10 | IPDI | 42.4 | 255 | 7.8 | 3.4 |
| 4 | 66.94 | Violet | 26.78 | 10.24 | 17.10 | IPDI | 42.4 | 255 | 7.8 | 3.4 |
| 5 | 69.85 | Cyan | 8.88 | 8.77 | 14.64 | IPDI | 42.4 | 231 | 6.6 | 4.4 |
| 6 | 58.63 | Blue | 9.25 | 9.40 | 13.07 | TMXDI | 42.8 | 210 | 7.1 | 3.15 |

EXAMPLE 7

Ink Formulation

The colored polyurethane dispersion (PUD) of Example 3 was transferred to a another container, sealed and stored for two days to permit the reaction to go to completion. It was then combined with a plasticizer[11], more water and a humectant[12], faltered and loaded into ink-jet cartridge. The amounts of each ingredient in this ink formulation are given in Table II. The amount of water added was sufficient to reduce the viscosity to about 3 centipoise, a suitable viscosity to allow the ink to be "jetted" in an Epson Stylus color printer.

[11]PEG 200 polyethylene glycol available from JT Baker Chemical Company of Phillipsburg, N.J.
[12]Triethanolamine available from Aldrich Chemical Company, Inc. of Milwaukee, Wis.

TABLE II

INK FORMULATION

| Amount of PUD (grams) | Amount of Plasticizer (grams) | Amount of Water (grams) | Amount of Humectant (grams) |
| --- | --- | --- | --- |
| 20 | 4.32 | 66.45 | 4.32 |

EXAMPLE 8

Evaluation of Ink Formulation

The ink of Example 7 was jetted on an Epson Stylus color printer to generate a solid fill image on Hammermill paper. The paper having the printed solid fill image was subjected to two waterfastness tests. In one test the sample was rubbed was stirred for 30 minutes. Viscosity was measured on a Brookfield viscometer to be about 3.87 cPs. The ink was filtered through a 1 micron glass fiber filter. The ink was jetted on an Epson Stylus color printer to generate a solid fill image. The printed solid filled image was subjected to several waterfastness tests. In one test the sample was rubbed with wet fingers without any noticeable smearing. In a second test the sample was placed under the running water of a faucet without any noticeable loss in color. In a third test the sample was taped onto a wheel and passed through water, and the ΔE color deviation was measured after 1 and 10 revolutions. Those results are shown in Table III. Table III shows the results of the red, which approximates a magenta, of Example 9 jetted from the Epson Stylus printer compared with the commercially available Hewlett Packard (HP) magenta ink jetted from an HP 1200C color printer. The color deviation of the ink in Example 9 is better, indicating less color change after exposure to water on the water wheel after both one and ten revolutions than the HP magenta ink.

TABLE III

| | ΔE (Color Devation) | |
| --- | --- | --- |
| | Example 9 Red | HP Magenta |
| 1-revolution | 6.48 | 7.4 |
| 10-revolutions | 14.63 | 21.97 |

While the invention has been described above with reference to specific embodiments thereof, it is apparent that many changes, modifications and variations can be made without departing from the inventive concept disclosed herein. It is to be understood that while reference has been made in this disclosure to just polyurethane dispersions, it is intended to encompass polyurethane-polyurea dispersions wherein the polymer is characterized by the occurrence of both urethane (—NH—CO—O) and urea (—NH—CO—NH—) groups in the macromolecular chain. Also, the ink jet composition of the present invention can be employed either in direct printing applications where the ink is applied directly to the final receiving substrate or in indirect or offset printing applications where the ink is first applied to an intermediate transfer surface and then to the final receiving surface. Similarly, the ink can be propelled from the print head by any conventional printing driver technique, such as piezoelectric transducers, bubble jets or drop-on-demand printing. Accordingly, it is intended to embrace all such changes, modifications and variations that fall within the spirit and broad scope of the appended claims. All patent applications, patents and other publications cited herein are incorporated by reference in their entirety.

What is claimed is:

1. A non-erasable ink-jet ink composition comprising the admixture of:

(1) an aqueous colored polyurethane dispersion that is the reaction product of:
      (a) a colored urethane propolymer that is the catalyzed reaction product of:
         (i) at least one polyol;
         (ii) at least one polyisocyanate;
         (iii) at least one internal surfactant; and
         (iv) at least one reactive colorant; wherein the stoichiometric equivalent molar ratio of internal surfactant to polyol is about 0.5:1 to about 2.0:1 and the stoichiometric equivalent molar ratio of NCO groups to total OH groups in said propolymer is about 1.2:1 to about 2.0:1;
      (b) at least one neutralizing agent;
      (c) a first aqueous dispersing medium; and
      (d) at least one chain extender;
   (2) a second aqueous dispersing medium; and
   (3) at least one humectant; wherein said ink-jet ink composition has a jettable viscosity from about 1 to about 20 centipoise at about 10° C. to about 45 ° C.

2. The ink-jet ink composition of claim 1 wherein said at least one polyol is selected from at least one member of the group consisting of polyether polyols, polyester polyols, polycarbonate polyols, silicone-based polyols and combinations thereof.

3. The ink-jet ink composition of claim 1 wherein said at least one polyisocyanate is selected from at least one member of the group consisting of aliphatic, cycloaliphatic, aromatic and heterocyclic polyisocyanates and combinations thereof.

4. The ink-jet ink composition of claim 1 wherein said at least one internal surfactant is selected from anionic internal surfactants, cationic internal surfactants and combinations thereof.

5. The ink-jet ink composition of claim 1 wherein said at least one internal surfactant is selected from at least one member of the group consisting of sulfonate diamines, sulfonate diols, dihydroxy carboxylic acids and combinations thereof.

6. The ink-jet ink composition of claim 1 wherein said at least one internal surfactant is α,α-dimethylolpropionic acid.

7. The ink-jet ink composition of claim 1 wherein said at least one reactive colorant is reactive with said polyisocyanate.

8. The ink-jet ink composition of claim 1 wherein said reactive colorant contains a hydroxyl group, an amine group or the combination thereof.

9. The ink-jet ink composition of claim 1 wherein said at least one reactive colorant is about 1 to about 20 percent by weight of said colored urethane prepolymer.

10. The ink-jet ink composition of claim 9 wherein said at least one reactive colorant is from about 7 to about 19 percent by weight of said colored urethane propolymer.

11. The ink-jet ink composition of claim 1 wherein the catalyst for making said colored urethane propolymer is dibutyltin dilaurate.

12. The ink-jet ink composition of claim 1 wherein said at least one neutralizing agent is a trialkylamine.

13. The ink-jet ink composition of claim 12 wherein said trialkylamine is triethylamine.

14. The ink-jet ink composition of claim 1 wherein the stoichiometric equivalent ratio of said neutralizing agent to said internal surfactant is about 0.5–1.02:1.

15. The ink-jet ink composition of claim 1 wherein said first aqueous dispersing medium is added in an amount where water constitutes from about 50 to about 90 percent by weight of said polyurethane dispersion.

16. The ink-jet ink composition of claim 1 wherein said at least one chain extender is selected from at least one member of the group consisting of diamines, triamines, diols, triols and combinations thereof.

17. The ink-jet ink composition of claim 1 wherein said at least one claim extender is ethylene diamine.

18. The ink-jet ink composition of claim 1 wherein the amount of said chain extender added is about 60 to about 100 percent of the stoichiometrically equivalent molar amount of said urethane prepolymer.

19. The ink-jet ink composition of claim 1 wherein said colored polyurethane dispersion is composed of particles ranging in size from about 0.01 microns to about 5.0 microns.

20. The ink-jet ink composition of claim 19 wherein said colored polyurethane dispersion is composed of particles ranging in size from about 0.03 to about 1.0 microns.

21. The ink-jet ink composition of claim 1 wherein sufficient second aqueous dispersing medium is added to obtain a jettable viscosity from about 1.5 to about 15 centiposes at about 10° C. to about 45° C.

22. The ink-jet ink composition of 1 wherein sufficient second aqueous dispersing medium is added so that said ink-jet composition has a pH from about 4 to about 10.

23. The ink-jet ink composition of claim 1 wherein sufficient second aqueous dispersing medium is added so that said ink-jet ink composition has a pH from about 5 to about 9.

24. The ink-jet ink composition of claim 1 wherein sufficient second aqueous dispersing medium is added so that said ink-jet ink composition has a pH from about 6 to about 8.

25. The ink-jet ink composition of claim 1 wherein said at least one humectant is selected from the group of glycerol, propylene glycol, polyethylene glycol and combinations thereof.

26. The ink-jet ink composition of claim 1 wherein the amount of said humectant added is from about 2% to about 20% by weight of said ink-jet ink composition.

27. The ink-jet ink composition of claim 1 further comprising at least one plasticizer.

28. The ink-jet ink composition of claim 27 wherein said at least one plasticizer is selected from at least one member of the group consisting of aliphatic polyols and phthalate esters and combinations thereof.

29. The ink-jet ink composition of claim 28 wherein said plasticizer is an aliphatic polyol.

30. The ink-jet ink composition of claim 29 wherein said aliphatic polyol is 1,6-hexane diol.

31. The ink-jet ink composition of claim 28 wherein said plasticizer is a phthalate ester.

32. The ink-jet ink composition of claim 31 wherein said phthalate ester is dioctylphthalate.

33. The ink-jet ink composition of claim 1 wherein said ink-jet ink composition is capable of forming a thin, durable plastic film having a storage modulus (E') from about $1 \times 10^8$ to about $4 \times 10^{10}$ dynes per square centimeter on a substrate.

34. A non-erasable ink-jet ink composition comprising the admixture of:

(i) an aqueous colored polyurethane dispersion that is the reaction product of:

(a) a colored urethane propolymer that is the catalyzed reaction product of:

(i) at least one polyol selected from at least one member of the group consisting of polyether polyols, polyester polyols, polycarbonate, polyols, silicone-based polyols and combinations thereof, (ii) at least one polyisocyanate selected from at least one member of the group consisting of aliphatic, cycloaliphatic, aromatic and heterocyclic polyisocyanates and combinations thereof;

(iii) at least one internal surfactant selected from at least one member of the group consisting of sulfonate diamines, sulfonate diols, dihydroxy carboxylic adds and combinations thereof; and (iv) at least one reactive colorant that is reactive with said polyisocyanate; wherein the stoichiometric equivalent molar ratio of internal surfactant to polyol is about 0.5:1 to about 2.0:1; and the stoichiometric equivalent molar ratio of NCO groups to total OH groups in said prepolymer is about 1.2:1 to about 2.0:1; wherein said at least one reactive colorant is about 1 to about 20 percent by weight of said colored urethane prepolymer, and wherein the catalyst for this reaction is dibutyltin dilaurate;

(b) at least one trialkylamine neutralizing agent;

(c) a first aqueous dispersing medium; and (d) at least one claim extender selected from at least one member of the group consisting of diamines, triamines, diols, triols and combinations thereof, and wherein said colored polyurethane dispersion is made of particles ranging in size from about 0.01 microns to about 5.0 microns; wherein the stoichiometric equivalent molar ratio of said neutralizing agent to said internal surfactant is about 0.5–1.02:1; wherein said first aqueous dispersing medium is added in an amount where water constitutes from about 50 to about 90 percent by weight of said colored polyurethane dispersion; and wherein the amount of said chain extender added is about 60 to about 100 percent of the stoichiometrically equivalent molar amount of said urethane prepolymer.

(2) a second aqueous dispersing medium; and (3) at least one humectant selected from the group of glycerol, propylene glycol, polyethylene glycol and combinations thereof; wherein the amount of said humectant added is from about 2% to about 20% by weight of said ink-jet ink composition; wherein said ink-jet ink composition has a jettable viscosity from about 1 to 20 centipoise at about 10 ° C. to about 45° C.; wherein said ink-jet ink has a pH from about 4 to about 10; and wherein said ink-jet ink composition is capable of forming a thin, durable plastic film having a storage modulus (E' ) from about $1 \times 10^8$ to about $4 \times 10^{10}$ dynes per square centimeter on a substrate.

35. The non-erasable ink-jet ink of claim 34 further comprising at least one plasticizer selected from at least one member of the group consisting of aliphatic polyols and phthalate esters and combinations thereof.

36. A process of using said ink-jet ink composition of claim 1 in a ink-jet printer.

37. A process of using said ink-jet ink composition of claim 34 in a ink-jet printer.

* * * * *

UNITED STATES PATENT AND TRADEMARK OFFICE
CERTIFICATE OF CORRECTION

PATENT NO. : 5,700,851
DATED : December 23, 1997
INVENTOR(S) : Jeffery H. Banning, et. al.

It is certified that error appears in the above-identified patent and that said Letters Patent is hereby corrected as shown below:

Column 9, line 24, after "urethane" and before "that" delete "propolymer" and insert --prepolymer--.

Column 10, line 10, after "urethane" and before "." delete "propolymer" and insert --prepolymer--.

Column 10, line 12, after "urethane" and before "is" delete "propolymer" and insert --prepolymer--.

Column 11, line 22, after "urethane" and before "that" delete "propolymer" and insert --prepolymer--.

Column 11, line 35, after "carboxylic" and before "and" delete "adds" and insert --acids--.

Signed and Sealed this

Second Day of June, 1998

Attest:

BRUCE LEHMAN

Attesting Officer

Commissioner of Patents and Trademarks